(12) United States Patent
Washiya

(10) Patent No.: US 10,929,030 B2
(45) Date of Patent: Feb. 23, 2021

(54) COMPUTER AND CONTROL METHOD

(71) Applicant: Hitachi, Ltd., Tokyo (JP)

(72) Inventor: Koji Washiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/491,223

(22) PCT Filed: Aug. 3, 2017

(86) PCT No.: PCT/JP2017/028193
§ 371 (c)(1),
(2) Date: Sep. 5, 2019

(87) PCT Pub. No.: WO2019/026225
PCT Pub. Date: Feb. 7, 2019

(65) Prior Publication Data
US 2020/0026442 A1 Jan. 23, 2020

(51) Int. Cl.
*G06F 12/00* (2006.01)
*G06F 3/06* (2006.01)
*H04L 9/08* (2006.01)

(52) U.S. Cl.
CPC ............ *G06F 3/0622* (2013.01); *G06F 3/067* (2013.01); *G06F 3/0611* (2013.01); *G06F 3/0659* (2013.01); *H04L 9/0822* (2013.01); *H04L 9/0869* (2013.01)

(58) Field of Classification Search
CPC .... G06F 3/0622; G06F 3/0611; G06F 3/0659; G06F 3/067; G06F 3/0689; H04L 9/0822; H04L 9/0869
See application file for complete search history.

(56) References Cited

U.S. PATENT DOCUMENTS

| | | | |
|---|---|---|---|
| 2008/0126813 A1 | 5/2008 | Kawakami | |
| 2012/0203951 A1* | 8/2012 | Wood | G11C 16/28 711/102 |
| 2017/0097795 A1 | 4/2017 | Nishina et al. | |

FOREIGN PATENT DOCUMENTS

| | | |
|---|---|---|
| JP | 2008-077366 A | 4/2008 |
| WO | 2015/155824 A1 | 10/2015 |

OTHER PUBLICATIONS

International Search Report of PCT/JP2017/028193 dated Nov. 7, 2017.

* cited by examiner

*Primary Examiner* — Shawn X Gu
(74) *Attorney, Agent, or Firm* — Mattingly & Malur, PC

(57) ABSTRACT

A computer comprises a controller and a storage apparatus which is configured to provide a storage area for storing data. The controller and the storage apparatus have a function of achieving encryption and decryption of data through use of an encryption key. The computer is configured to: execute encryption key setting processing for setting the encryption key in the controller and the storage apparatus so that the controller holds the same encryption key as the encryption key of the storage apparatus; and determine whether to enable the function of any one of the controller and the storage apparatus, based on load states of the controller and the storage apparatus when an I/O request is received.

13 Claims, 16 Drawing Sheets

DRIVE MANAGEMENT INFORMATION 201

| DRIVE ID | LOCATION | TYPE | MODEL NAME | ADDRESS | ENCRYPTION FUNCTION |
|---|---|---|---|---|---|
| a | 00/00 | SAS | AAA | 0x1111 | 0 |
| b | 00/01 | SSD | BBB | 0x2222 | 0 |
| c | 00/02 | FMD | CCC | 0x3333 | 1 |
| ⋮ | ⋮ | ⋮ | ⋮ | ⋮ | ⋮ |

*FIG. 3*

KEY MANAGEMENT INFORMATION 202

| ID | ENCRYPTION KEY | LOCATION |
|---|---|---|
| 0 | 0xABCDEFGH | 00/00 |
| 1 | 0xIJKLMNOP | 00/01 |
| 2 | 0xQRSTUVWX | 00/02 |
| ⋮ | ⋮ | ⋮ |

*FIG. 4*

I/O MANAGEMENT INFORMATION 203

CONTROLLER I/O INFORMATION 500

| CONTROLLER ID (501) | I/O COUNT (502) | AVERAGE RESPONSE TIME [ms] (503) | TOTAL DATA TRANSFER LENGTH [MByte] (504) |
|---|---|---|---|
| 0 | 1,000 | 2 | 8.1 |
| 1 | 500 | 8 | 266.2 |
| 2 | 750 | 1 | 6.1 |
| ⋮ | ⋮ | ⋮ | ⋮ |

ISSUED I/O INFORMATION 510

| ID (511) | TARGET (512) | TAG NUMBER (513) | TRANSFER TYPE (514) | TRANSFER LENGTH (515) | ENCRYPTION FLAG (516) |
|---|---|---|---|---|---|
| 0 | AA | 0x001 | Read | 520 | 0 |
| 1 | BB | 0x00A | Write | 8 | 1 |
| 2 | CC | 0x00F | Write | 8 | 1 |
| ⋮ | ⋮ | ⋮ | ⋮ | ⋮ | ⋮ |

DRIVE I/O INFORMATION 520

| DRIVE ID (521) | I/O COUNT (522) | AVERAGE RESPONSE TIME [ms] (523) | TOTAL DATA TRANSFER LENGTH [MByte] (524) |
|---|---|---|---|
| a | 64 | 10 | 2.0 |
| b | 30 | 24 | 414.1 |
| c | 20 | 16 | 7.2 |
| ⋮ | ⋮ | ⋮ | ⋮ |

*FIG. 5*

| Bit<br>Byte | 7 | 6 | 5 | 4 | 3 | 2 | 1 | 0 |
|---|---|---|---|---|---|---|---|---|
| 0 | OPERATION CODE (28h) | | | | | | | |
| 1 | RDPROTECT | | | DPO | FUA | Reserved | FUA_NV | Obsolete |
| 2 | (MSB) | | | | | | | |
| ... | LOGICAL BLOCK ADDRESS | | | | | | | |
| 5 | | | | | | | | (LSB) |
| 6 | Reserved | | | | GROUP NUMBER | | | |
| 7 | (MSB) | | | | | | | |
| 8 | TRANSFER LENGTH | | | | | | | (LSB) |
| 9 | CONTROL | | | | | | | |

*FIG. 8*

COMPUTER AND CONTROL METHOD

BACKGROUND OF THE INVENTION

This invention relates to a storage system having an encryption function of achieving encryption and decryption and a control method therefor.

In recent years, with the increasing demand for improvement in security, an encryption function that ensures the confidentiality of data has been attracting attention. As methods of implementing the encryption function, there are known a method of implementing the encryption function in a host computer, a method of implementing the encryption function in a controller or other such arithmetic unit configured to control a storage apparatus, and a method of implementing the encryption function in a storage apparatus.

JP 2008-77366 A is known for an invention in which a host computer and a storage control device implement an encryption function. In JP 2008-77366 A, it is described that "the user sets in advance an attribute relating to the encryption of each storage apparatus 4 in consideration of, for example, the kind of data (encrypted data or plaintext data) received from the host apparatus 6 and the importance degree of data. The operation policy of the user is registered in the setting information management module 2D through the intermediation of the setting module 5. When the data received from the host apparatus 5 is encrypted data, the storage control apparatus 1 causes the storage apparatus 4 to store the encrypted data as it is without performing encryption processing. When the received data is plaintext data, the storage control apparatus 1 performs encryption processing to convert the plaintext data into encrypted data, and causes the storage apparatus 4 to store the encrypted data."

SUMMARY OF THE INVENTION

In an apparatus in which different internal devices including a controller and a storage apparatus have an encryption function, each internal device performs encryption processing and decryption processing through use of a different encryption key. Therefore, when the controller encrypts data, the controller is required to execute the decryption processing, and when the storage apparatus encrypts data, the storage apparatus is required to execute the decryption processing.

Processing loads imposed on the controller and the storage apparatus change momentarily in accordance with the operating status of a system. Therefore, when the encryption processing or the decryption processing is executed even with the heavy loads, access performance is degraded.

This invention provides a computer configured to dynamically change an internal device whose encryption function is to be enabled, depending on the load states of different types of internal devices each having an encryption function, and a control method therefor.

A representative example of the present invention disclosed in this specification is as follows: a computer comprises at least one arithmetic unit, a first memory coupled to the at least one arithmetic unit, at least one controller, at least one second memory coupled to the at least one controller, and at least one storage apparatus, which is coupled to the at least one controller, and is configured to provide a storage area for storing data. The at least one controller and the at least one storage apparatus have a function of achieving encryption and decryption of data through use of an encryption key. The computer is configured to: execute encryption key setting processing for setting the encryption key in the at least one controller and the at least one storage apparatus so that the at least one controller holds the same encryption key as the encryption key of the at least one storage apparatus; and determine whether to enable the function of any one of the at least one controller and the at least one storage apparatus, based on load states of the at least one controller and the at least one storage apparatus in a case where an I/O request with respect to the at least one storage apparatus is received.

According to at least one embodiment of this invention, the controller and the storage apparatus each hold the same encryption key, and hence a device whose encryption function is to be enabled can be dynamically changed depending on the load state. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3 is a table for showing an example of the data structure of drive management information in the first embodiment;

FIG. 4 is a table for showing an example of the data structure of key management information in the first embodiment;

FIG. 5 is a table for showing an example of the data structure of I/O management information in the first embodiment;

FIG. 8 is a diagram for illustrating an example of a command included in an I/O request to be issued to a drive in the first embodiment;

DETAILED DESCRIPTION OF THE PREFERRED EMBODIMENTS

Figure 1:
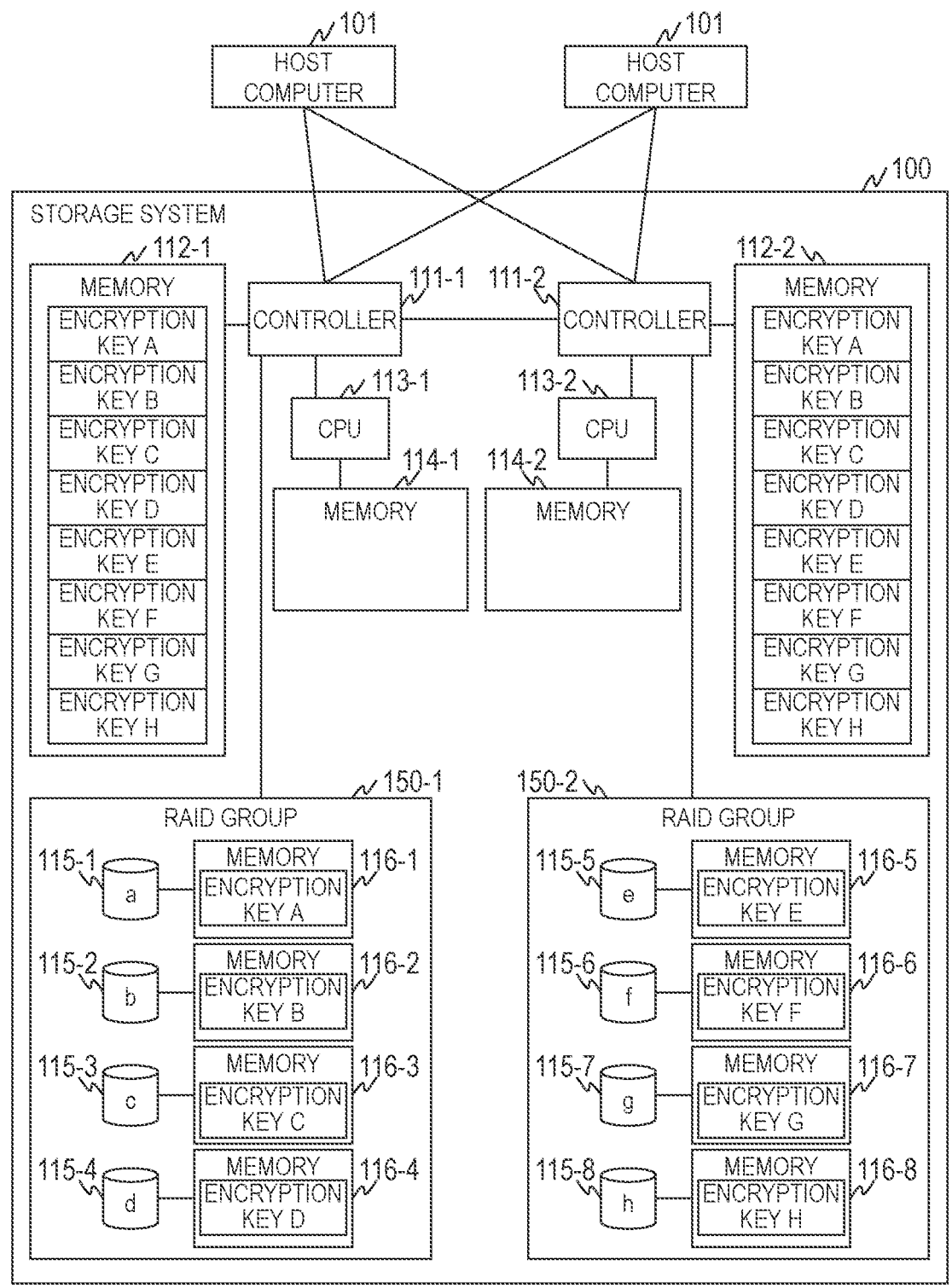
FIG. 1 is a diagram for illustrating a configuration example of a computer system in a first embodiment of this invention.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

FIG. 1 is a diagram for illustrating a configuration example of a computer system in a first embodiment of this invention.

The computer system in the first embodiment includes a storage system 100 and a plurality of host computers 101. The computer system may include a plurality of storage systems 100. The number of host computers 101 may be one, or three or more.

The storage system 100 and the host computer 101 may be coupled to each other through a wide area network (WAN), a local area network (LAN), a storage area network (SAN), or other such network, or may be directly coupled to each other. The coupling may be performed in any one of a wireless manner and a wired manner.

The host computer 101 is a computer configured to write and read data to/from the storage system 100. The host computer 101 includes a CPU (not shown), a memory (not shown), a network interface (not shown), and an I/O interface (not shown).

The storage system 100 manages data to be accessed by the host computer 101. The storage system 100 includes a plurality of controllers 111, a plurality of memories 112, a plurality of CPUs 113, a plurality of memories 114, and a plurality of drives 115. Each of the numbers of controllers 111, memories 112, CPUs 113, memories 114, and drives 115 may be one.

The CPU 113 executes a program stored in the memory 114. The CPU 113 executes processing in accordance with the program stored in the memory 114, to thereby operate as a module configured to implement a specific function.

The memory 114 stores a program to be executed by the CPU 113 and information to be used by the program. In the first embodiment, the memory 114 is assumed to be a volatile memory.

The controller 111 is an arithmetic unit configured to control access to the drive 115. The controller 111 in the first embodiment has an encryption function of achieving encryption and decryption of data. The controller 111 may be coupled to a cache memory to be used as a cache area.

The memory 112 stores a program to be executed by the controller 111 and information to be used by the program. In the first embodiment, the memory 112 is assumed to be a nonvolatile memory. As illustrated in FIG. 1, the memory 112 in the first embodiment stores an encryption key held by each of the drives 115. The encryption key is a key for encrypting or decrypting data.

The drive 115 is an apparatus configured to store data. Conceivable examples of the drive 115 include a hard disk drive (HDD) and a solid state drive (SSD). The drive 115 includes a memory 116 configured to store, for example, information to be used for control. In the first embodiment, the memory 116 is assumed to be a nonvolatile memory.

As illustrated in FIG. 1, the storage system 100 includes a RAID group 150 formed of a plurality of drives 115. Specifically, the RAID group 150-1 is formed of the drives 115-1, 115-2, 115-3, and 115-4, and the RAID group 150-2 is formed of the drives 115-5, 115-6, 115-7, and 115-8.

The drives 115 include the drives 115 having the encryption function and the drives 115 that do not have the encryption function. All the drives 115 illustrated in FIG. 1 have the encryption function. In addition, as illustrated in FIG. 1, the memory 116 stores an encryption key to be used by each of the drives 115. The encryption keys stored in the memories 116 of the respective drives 115 are all different.

Figure 2:
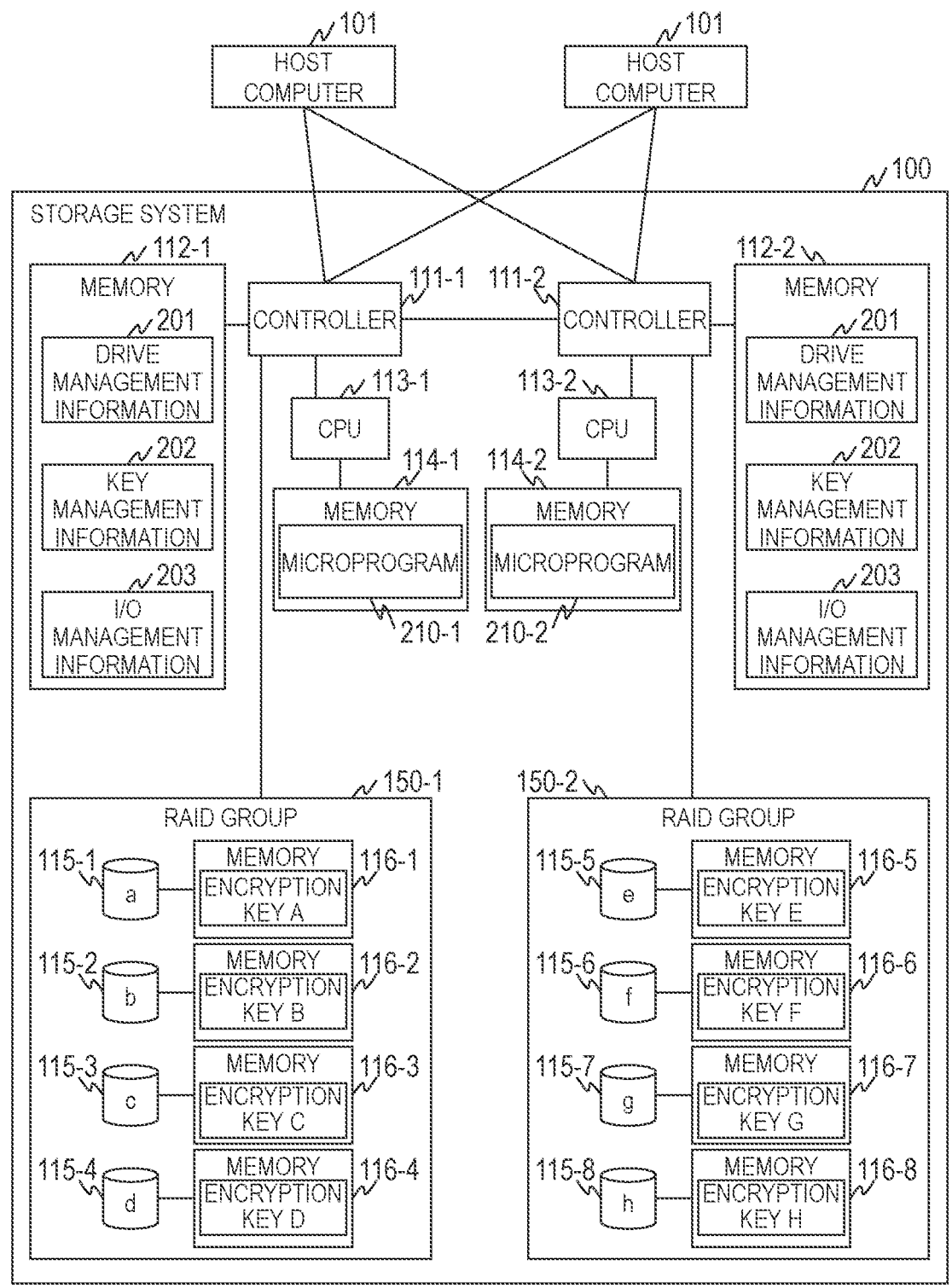
FIG. 2 is a diagram for illustrating a software configuration of a storage system in the first embodiment.

FIG. 2 is a diagram for illustrating a software configuration of the storage system 100 in the first embodiment.

The memory 114 coupled to the CPU 113 stores a microprogram 210. The microprogram 210 is a program for providing a function of controlling the entire storage system 100.

The memory 112 coupled to the controller 111 stores drive management information 201, key management information 202, and I/O management information 203.

The drive management information 201 is information for managing configurations of the drives 115. Details of a data structure of the drive management information 201 are described with reference to FIG. 3.

The key management information 202 is information for managing the encryption keys held by the respective drives 115. Details of a data structure of the key management information 202 are described with reference to FIG. 4.

The I/O management information 203 is information on I/O requests. In the first embodiment, the number of I/O requests to be processed by the controller 111 and the drive 115 is used as an index indicating the magnitude of a load. Details of a data structure of the I/O management information 203 are described with reference to FIG. 5.

The memory 114 coupled to the CPU 113 stores copies of the drive management information 201 and the I/O management information 203.

FIG. 3 is a table for showing an example of the data structure of the drive management information 201 in the first embodiment.

The drive management information 201 includes a record formed of a drive ID 301, a location 302, a type 303, a model name 304, an address 305, and an encryption function 306. One record corresponds to one drive 115.

The record included in the drive management information 201 may include a field other than those described above, or may include only a part of the above-mentioned fields.

The drive ID 301 is a field for storing identification information on the drive 115. The drive ID 301 is also used as identification information on a record included in the drive management information 201.

The location 302 is a field for storing information indicating the installation place of the drive 115 in the storage system 100.

The type 303 is a field for storing information indicating a type of the drive 115. The model name 304 is a field for storing a model name of the drive 115. The address 305 is a field for storing an address for access to the drive 115.

The encryption function 306 is a field for storing a value indicating whether or not the drive 115 has an encryption function. In the first embodiment, the encryption function 306 stores any one of "0" and "1". The value of "0" indicates that the drive 115 does not have an encryption function, and the value of "1" indicates that the drive 115 has an encryption function.

FIG. 4 is a table for showing an example of the data structure of the key management information 202 in the first embodiment.

The key management information 202 includes a record formed of an ID 401, an encryption key 402, and a location 403. One record corresponds to one encryption key.

The record included in the key management information 202 may include a field other than those described above, or may include only a part of the above-mentioned fields.

The ID 401 is a field for storing identification information for uniquely identifying the record. The encryption key 402 is a field for storing the encryption key. The location 403 is the same field as the location 302.

The controller 111 can associate the encryption key and the drive 115 with each other through the location 403.

FIG. 5 is a table for showing an example of the data structure of the I/O management information 203 in the first embodiment.

The I/O management information 203 includes controller I/O information 500, issued I/O information 510, and drive I/O information 520.

The controller I/O information 500 is information for managing I/O requests received from the host computer 101 by the controller 111. The controller I/O information 500 includes a record formed of a controller ID 501, an I/O count 502, an average response time 503, and a total data transfer length 504. One record corresponds to one controller 111.

The record included in the controller I/O information 500 may include a field other than those described above, or may include only a part of the above-mentioned fields.

The controller ID 501 is a field for storing identification information for identifying the controller 111. The I/O count 502 is a field for storing the number of I/O requests received by the controller 111. The average response time 503 is a field for storing the average value of response times required for the received I/O requests. The total data transfer length 504 is a field for storing the total length of data transferred based on the received I/O request.

The issued I/O information 510 is information for managing an I/O request issued to the drive 115 by the controller 111. The issued I/O information 510 includes a record formed of an ID 511, a target 512, a tag number 513, a transfer type 514, a transfer length 515, and an encryption flag 516. One record corresponds to one I/O request issued to the drive 115.

The ID 511 is a field for storing identification information for uniquely identifying the record. The target 512 is a field for storing identification information on a transmission destination of the I/O request. The tag number 513 is a field for storing a tag used for tagged queueing. The transfer type 514 is a field for storing a type of the I/O request. The transfer length 515 is a field for storing the data length of data transferred based on the I/O request. The encryption flag 516 is a field for storing a value for determining whether or not the encryption function of the drive 115 is enabled.

In the first embodiment, the encryption flag 516 stores any one of "0" and "1". The value of "0" indicates that the encryption function of the drive 115 is disabled, and the value of "1" indicates that the encryption function of the drive 115 is enabled.

The drive I/O information 520 is information for managing the I/O requests received from the controller 111 by the drive 115. The drive I/O information 520 includes a record formed of a drive ID 521, an I/O count 522, an average response time 523, and a total data transfer length 524. One record corresponds to one drive 115.

The record included in the drive I/O information 520 may include a field other than those described above, or may include only a part of the above-mentioned fields.

The drive ID 521 is the same as the drive ID 301. The I/O count 522 is a field for storing the number of I/O requests received by the drive 115. The average response time 523 is a field for storing the average value of response times required for the received I/O requests. The total data transfer length 524 is a field for storing the total length of data transferred based on the received I/O request.

Next, processing to be executed by the storage system 100 is described in detail.

Figure 6:
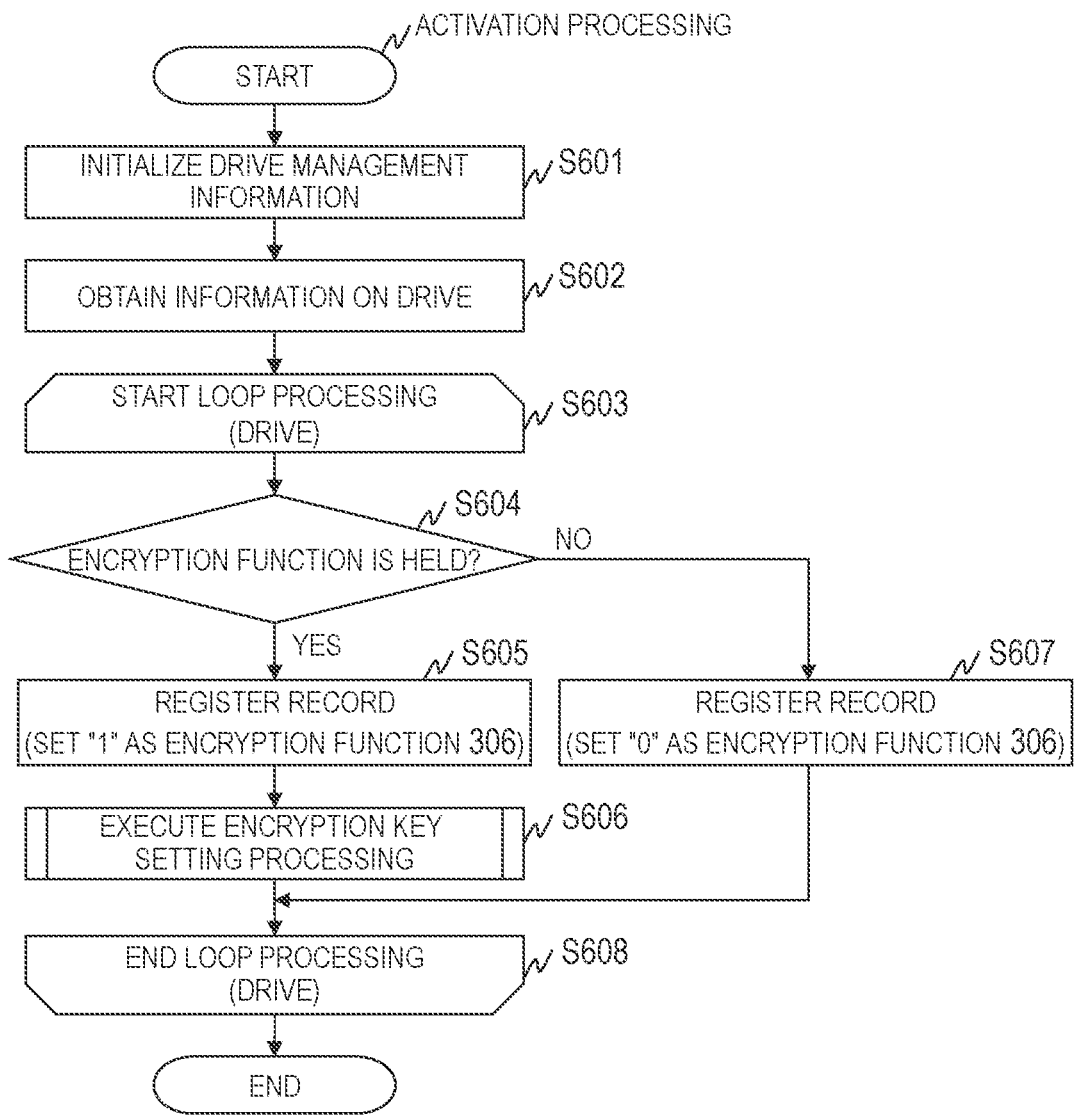
FIG. 6 is a flow chart for illustrating activation processing to be executed by a controller in the first embodiment.

FIG. 6 is a flow chart for illustrating activation processing to be executed by the controller 111 in the first embodiment.

When powered on, the storage system 100 activates the microprogram 210 in accordance with a normal activation procedure. The activated microprogram 210 instructs each of the controllers 111 to start the activation processing. In a case of receiving this instruction, each of the controllers 111 starts the activation processing described below.

The controller 111 initializes the drive management information 201 (Step S601), and then obtains the information indicating the features of the drive 115 from the plurality of drives 115 coupled thereto (Step S602). The information includes the information indicating the presence or absence of the encryption function, the installation place, the type, the model, and the address.

Subsequently, the controller 111 starts loop processing for the drive 115 (Step S603). Specifically, the controller 111 selects one of the drives 115.

Subsequently, the controller 111 determines based on the information obtained from the selected drive 115 whether or not the selected drive 115 has the encryption function (Step S604).

In a case of determining that the selected drive 115 has the encryption function, the controller 111 adds, to the drive management information 201, a record having "1" set as the encryption function 306 (Step S605).

Subsequently, the controller 111 executes encryption key setting processing in coordination with the CPU 113 and the drive 115 (Step S606). After that, the controller 111 advances to Step S608. In the first embodiment, the controller 111 transmits, to the CPU 113, a message for requesting the CPU 113 to start the encryption key setting processing.

In the encryption key setting processing, an encryption key is generated to be registered in the key management information 202 and set in the selected drive 115. Details of the encryption key setting processing are described with reference to FIG. 7A and FIG. 7B.

In Step S604, in a case of determining that the selected drive 115 does not have an encryption function, the controller 111 adds, to the drive management information 201, a record having "0" set as the encryption function 306 (Step S607). After that, the controller 111 advances to Step S608.

In Step S608, the controller 111 determines whether or not the processing has been completed for all the drives 115 for which the information has been obtained (Step S608).

In a case of determining that the processing has not been completed for all the drives 115 for which the information has been obtained, the controller 111 returns to Step S603 to execute the same processing. In a case of determining that the processing has been completed for all the drives 115 for which the information has been obtained, the controller 111 brings the activation processing to an end.

After the end of the activation processing, the controller 111 transmits the drive management information 201 to another controller 111. In a case of receiving the drive management information 201 from another controller 111, the controller 111 updates the current drive management information 201. This process allows the respective controllers 111 to grasp the information on all the drives 115 in the storage system 100.

In a case where the drive management information 201 is stored in a shared memory to be accessed by the plurality of controllers 111, the controller 111 is not required to transmit the drive management information 201 to another controller 111.

Figure 7A:
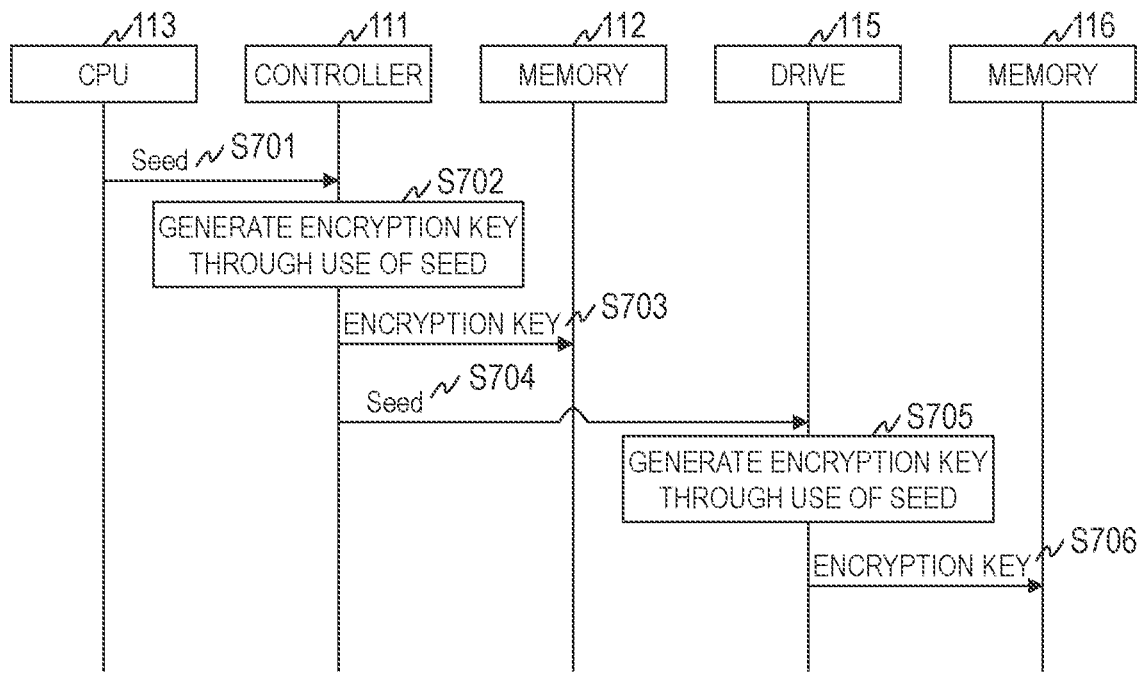
FIG. 7A and FIG. 7B are sequence diagrams for illustrating encryption key setting processing in the first embodiment.
Figure 7B:
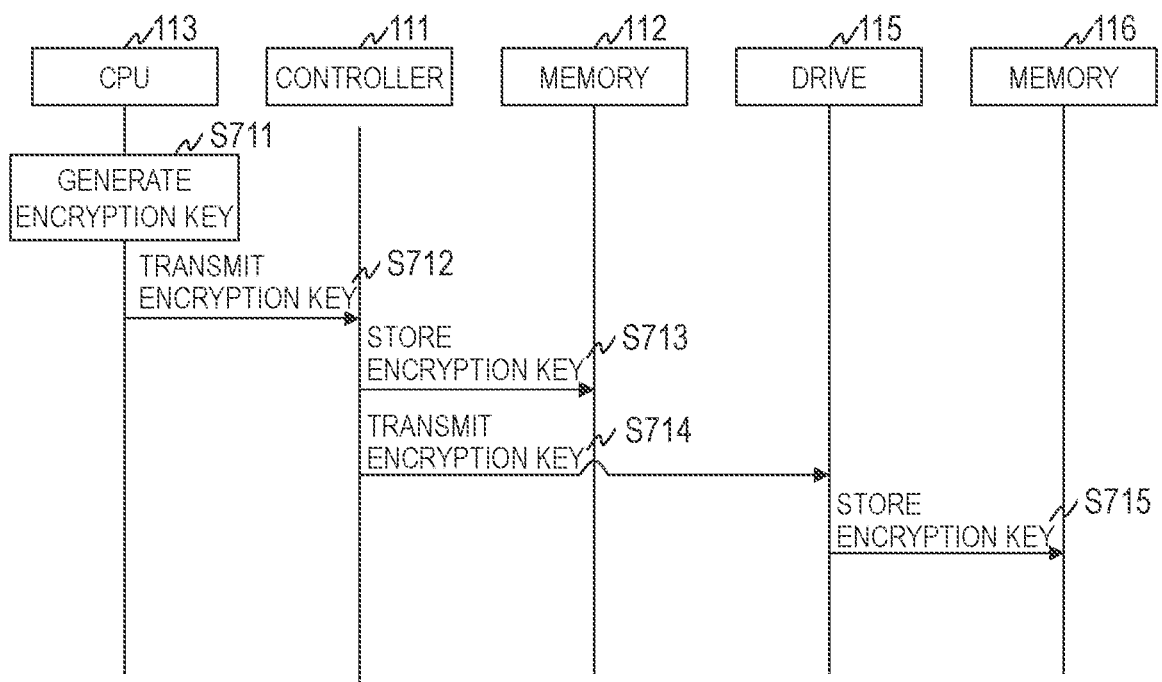

FIG. 7A and FIG. 7B are sequence diagrams for illustrating the encryption key setting processing in the first embodiment. In FIG. 7A and FIG. 7B, two kinds of encryption key setting processing involving two different methods are illustrated.

First, the encryption key setting processing illustrated in FIG. 7A is described.

The CPU 113 configured to execute the microprogram 210 transmits a seed to the controller 111 (Step S701).

The controller 111 generates an encryption key through use of the seed (Step S702), and stores the generated encryption key in the memory 112 (Step S703).

Specifically, the controller 111 adds a record to the key management information 202 to set the identification information as the ID 401 and set the generated encryption key as the encryption key 402. The controller 111 refers to the drive management information 201 to obtain the value of the location 302 in the record corresponding to the drive 115 selected in Step 603. The controller 111 sets the obtained value as the location 403 in the record added to the key management information 202.

The controller 111 transmits the seed to the selected drive 115 (Step S704).

The selected drive 115 generates an encryption key through use of the seed (Step S705), and stores the generated encryption key in the memory 116 (Step S706).

Next, the encryption key setting processing illustrated in FIG. 7B is described.

The CPU 113 configured to execute the microprogram 210 generates an encryption key (Step S711), and transmits the generated encryption key to the controller 111 (Step S712).

The controller 111 stores the received encryption key in the memory 112 (Step S713). The processing of Step S713 is the same as the processing of Step S703.

The controller 111 transmits the encryption key to the drive 115 (Step S714).

The drive 115 stores the received encryption key in the memory 116 (Step S715).

In FIG. 7A, the CPU 113 serves as the transmission source of the seed, but the host computer 101 may serve as the transmission source of the seed instead. In FIG. 7B, the CPU 113 generates an encryption key, but the host computer 101 may generate an encryption key instead.

FIG. 8 is a diagram for illustrating an example of a command included in an I/O request to be issued to the drive 115 in the first embodiment.

In FIG. 8, a read command is illustrated as an example. In the first embodiment, one bit of the reserved three bits indicated by the bold frame is used as information for determining whether or not to enable the encryption function of the drive 115. In the following description, the information for determining whether or not to enable the encryption function of the drive 115 is also referred to as "determination information".

The method of setting the determination information illustrated in FIG. 8 is merely an example, and this invention is not limited thereto.

Figure 9:
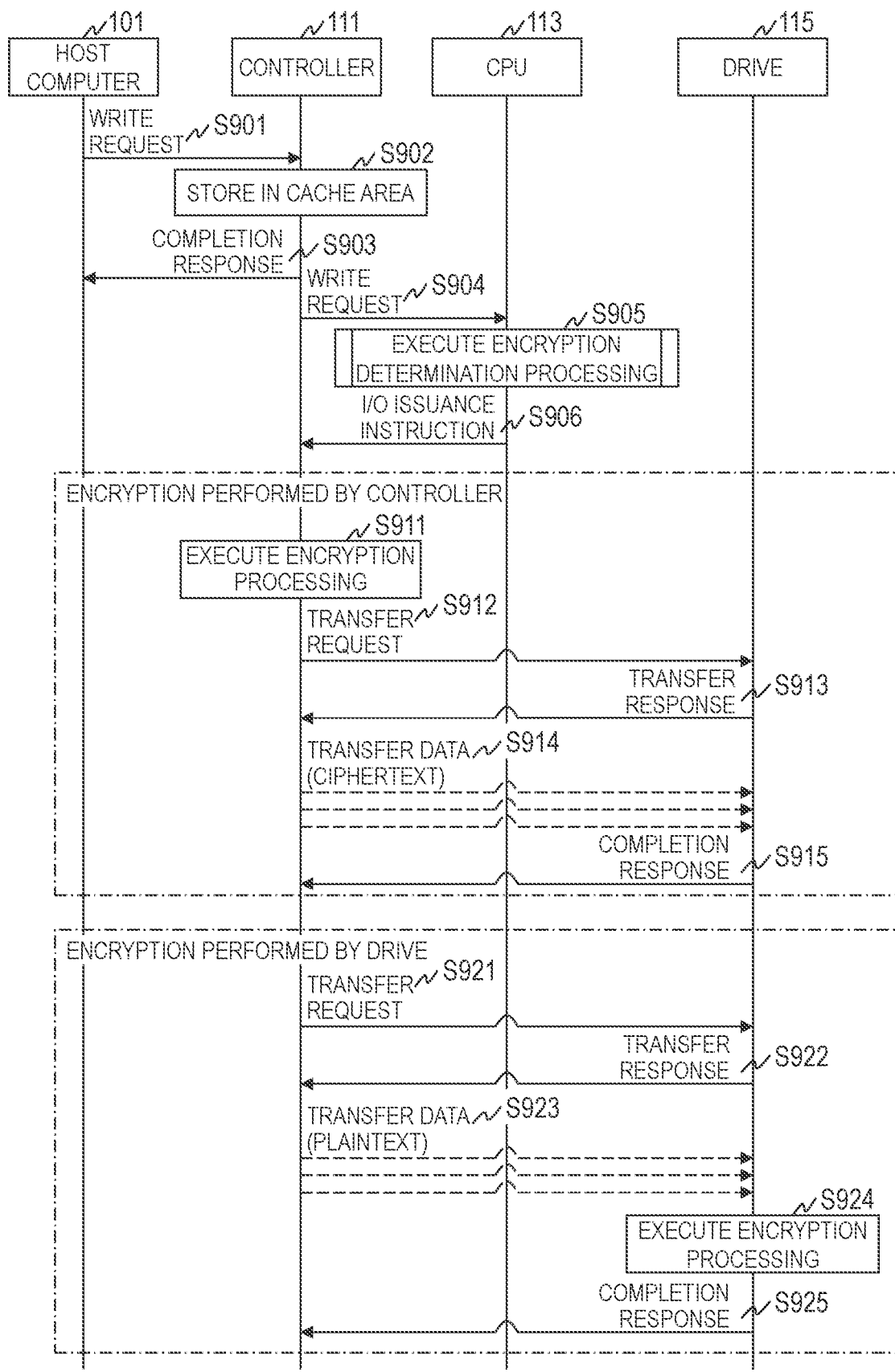
FIG. 9 is a sequence diagram for illustrating processing to be executed in a case where the storage system in the first embodiment receives a write request.

FIG. 9 is a sequence diagram for illustrating processing to be executed in a case where the storage system 100 in the first embodiment receives a write request.

The host computer 101 transmits a write request to the storage system 100 (Step S901).

In a case of receiving the write request, the controller 111 of the storage system 100 stores the write request in the cache area of the memory 112 (Step S902), and transmits a completion response to the host computer 101 (Step S903). The controller 111 also transmits the write request to the CPU 113 (Step S904). The CPU 113 analyzes the write request, to thereby identify the drive 115 (target drive 115) to which data is to be written and the controller 111 to which the target drive 115 is to be coupled. It should be noted that the method of analyzing the write request is a known technology, and hence a detailed description thereof is omitted.

The controller 111 to which the drive 115 is to be coupled indicates that the controller 111 and the drive 115 are directly coupled to each other without the intermediation of another controller 111.

In a case of receiving the write request, the CPU 113 executes encryption determination processing (Step S905). In the encryption determination processing, the CPU 113 determines the device on which encryption processing is to be executed, based on the load states of the controller 111 and the drive 115. Details of the encryption determination processing are described with reference to FIG. 11A and FIG. 11B.

The CPU 113 transmits an I/O issuance instruction including determination information for instructing to enable or disable the encryption function of the drive 115, to the controller 111 based on the result of the encryption determination processing (Step S906).

In a case where it is determined that the encryption function of the drive 115 is to be disabled, that is, in a case where it is determined that the encryption function of the controller 111 is to be enabled, the CPU 113 generates an I/O issuance instruction including the determination information for instructing to disable the encryption function of the drive 115. In a case where it is determined that the encryption function of the drive 115 is to be enabled, the CPU 113 generates an I/O issuance instruction including the determination information for instructing to enable the encryption function of the drive 115.

In the following description, the determination information for instructing to disable the encryption function of the drive 115 is referred to as "first determination information", and the determination information for instructing to enable the encryption function of the drive 115 is referred to as "second determination information".

In a case of receiving the I/O issuance instruction including the first determination information in Step S906, the controller 111 executes the encryption processing on the data included in the write request (Step S911). Specifically, the following processing is executed.

The controller 111 refers to the drive management information 201 to obtain the value of the location 302 in the record corresponding to the drive 115 to which the data is to be written. The controller 111 refers to the key management information 202 to search for the record in which the value of the location 403 matches the value obtained from the drive management information 201. With this configuration, it is possible to obtain the encryption key held by the drive 115 to which the data is to be written.

The controller 111 uses the encryption key obtained from the key management information 202 to encrypt the data included in the write request. It should be noted that a known method may be used for the encryption processing, and hence a detailed description thereof is omitted. The processing of Step S911 has been described above.

Subsequently, the controller 111 generates a command including the received first determination information, and transmits a transfer request including the command to the drive 115 (Step S912). In a case of receiving the transfer request, the drive 115 transmits a transfer response to the controller 111 (Step S913). After receiving the transfer response, the controller 111 transfers the encrypted data to the drive 115 (Step S914).

After all the data is transferred to the drive 115, the drive 115 transmits a completion response to the controller 111 (Step S915).

In a case of receiving the I/O issuance instruction including the second determination information in Step S906, the controller 111 generates a command including the received second determination information, and transmits a transfer request including the command to the drive 115 (Step S921). In a case of receiving the transfer request, the drive 115 transmits the transfer response to the controller 111 (Step S922). After receiving the transfer response, the controller 111 transfers plaintext data to the drive 115 (Step S923).

After all the data is transferred to the drive 115, the drive 115 uses the encryption key stored in the memory 116 to execute the encryption processing (Step S924). After the end of the encryption processing, the drive 115 transmits a completion response to the controller 111 (Step S925).

Figure 10:
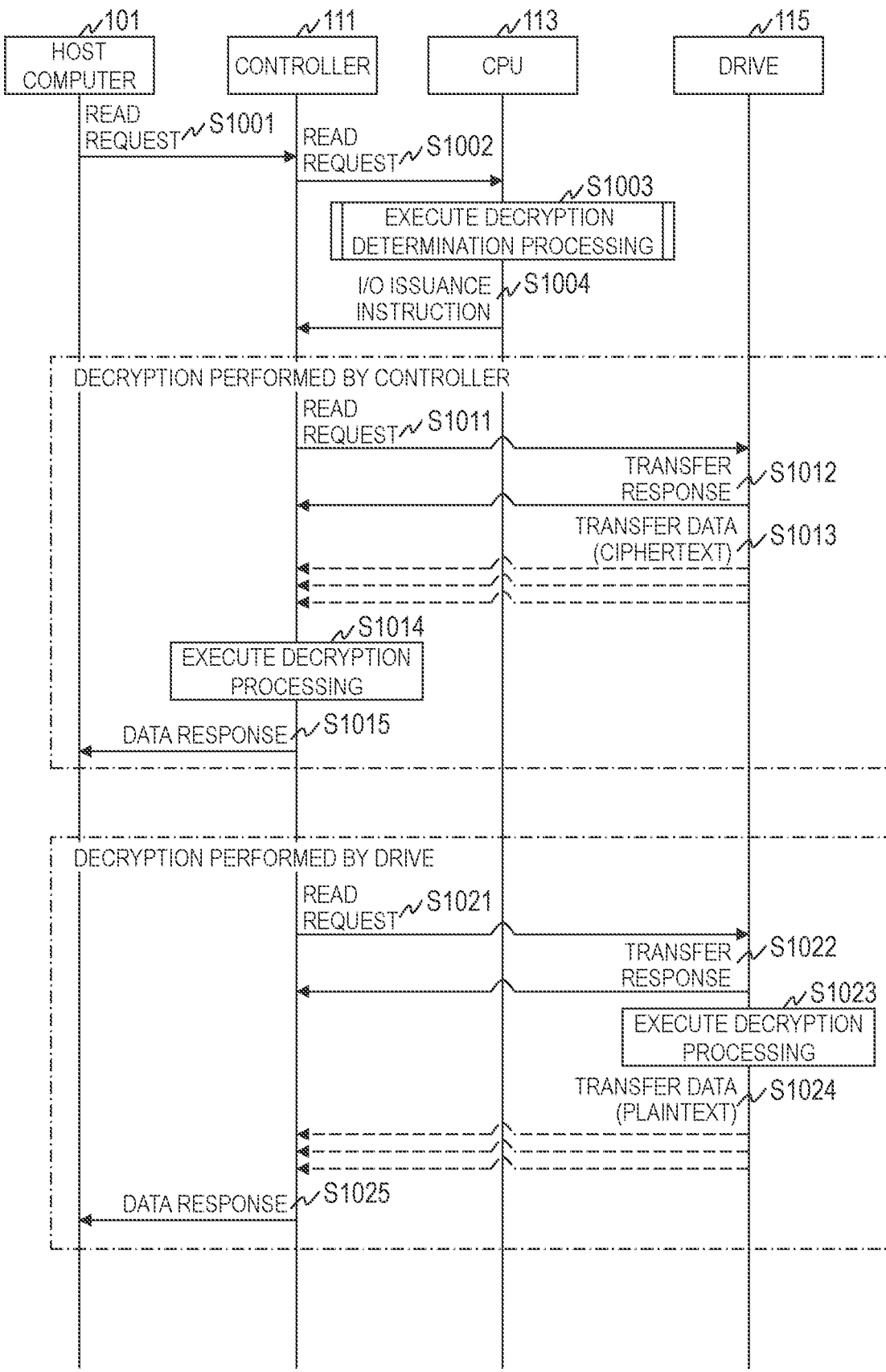
FIG. 10 is a sequence diagram for illustrating processing to be executed in a case where the storage system in the first embodiment receives a read request.

FIG. 10 is a sequence diagram for illustrating processing to be executed in a case where the storage system 100 in the first embodiment receives a read request.

The host computer 101 transmits a read request to the storage system 100 (Step S1001).

In a case of receiving the read request, the controller 111 of the storage system 100 transmits the read request to the CPU 113 (Step S1002). The CPU 113 analyzes the read request, to thereby identify the drive 115 (target drive 115) from which data is to be read. It should be noted that the method of analyzing the read request is a known technology, and hence a detailed description thereof is omitted.

In a case of receiving the read request, the CPU 113 executes decryption determination processing (Step S1003). In the decryption determination processing, the CPU 113 determines the device on which decryption processing is to be executed, based on the load states of the controller 111 and the drive 115. Details of the decryption determination processing are described with reference to FIG. 12A and FIG. 12B.

The CPU 113 transmits the I/O issuance instruction including any one of the first determination information and the second determination information to the controller 111 based on the result of the decryption determination processing (Step S1004).

In a case of receiving the I/O issuance instruction including the first determination information in Step S1004, the controller 111 generates a command including the received first determination information, and transmits the read request including the command to the drive 115 (Step S1011). In a case of receiving the read request, the drive 115 transmits the transfer response to the controller 111 (Step S1012), and transfers the encrypted data to the controller 111 (Step S1013).

In a case of receiving all the data from the drive 115, the controller 111 executes decryption processing on the encrypted data (Step S1014), and transmits a data response including the decrypted data to the host computer 101 (Step S1015). Specifically, the following processing is executed.

The controller 111 refers to the drive management information 201 to obtain the value of the location 302 in the record corresponding to the drive 115 from which the data is to be read. The controller 111 refers to the key management information 202 to search for the record in which the value of the location 403 matches the value obtained from the drive management information 201. With this configuration, it is possible to obtain the encryption key held by the drive 115 from which the data is to be read.

The controller 111 uses the encryption key obtained from the key management information 202 to decrypt the data read from a storage area of the target drive 115. It should be noted that a known method may be used for the decryption processing, and hence a detailed description thereof is omitted. The processing of Step S1014 has been described above.

In a case of receiving the I/O issuance instruction including the second determination information in Step S1004, the controller 111 generates a command including the received second determination information, and transmits a read request including the command to the drive 115 (Step S1023). In a case of receiving the read request, the drive 115 transmits the transfer response to the controller 111 (Step S1022). Further, the drive 115 uses the encryption key stored in the memory 116 to execute the decryption processing (Step S1023). After the end of the decryption processing, the drive 115 transfers the decrypted data to the controller 111 (Step S1024).

In a case of receiving all the data from the drive 115, the controller 111 transmits the data response including the decrypted data to the host computer 101 (Step S1025).

Figure 11A:
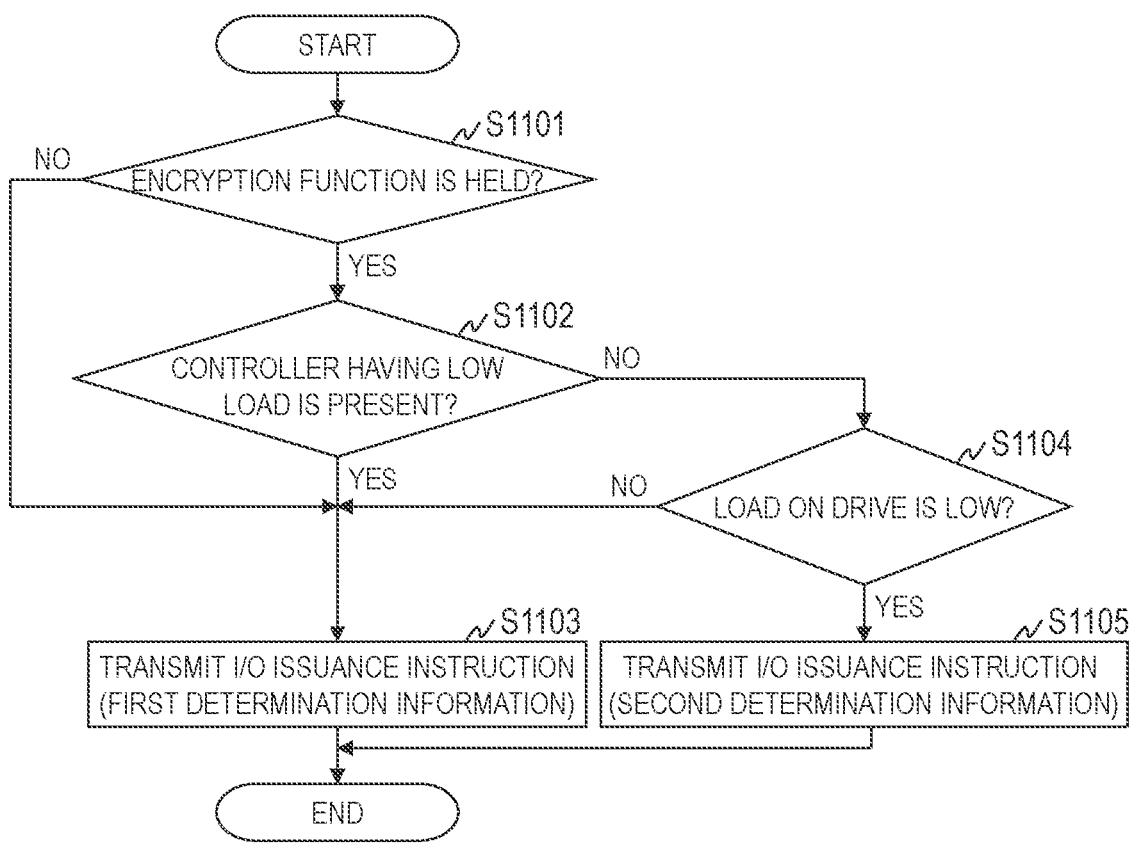
FIG. 11A and FIG. 11B are flow charts for illustrating encryption determination processing to be executed by a CPU in the first embodiment.
Figure 11B:
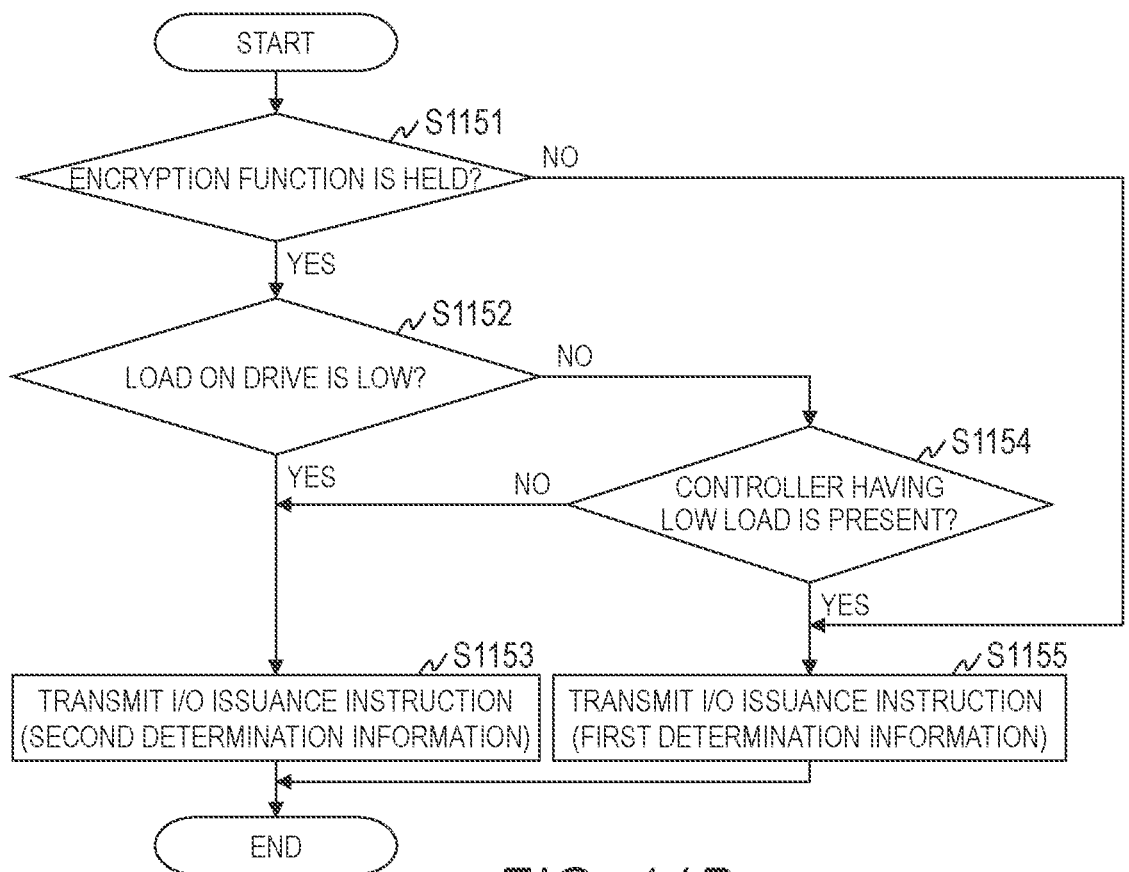

FIG. 11A and FIG. 11B are flow charts for illustrating the encryption determination processing to be executed by the CPU 113 in the first embodiment.

FIG. 11A is the flow chart for illustrating the encryption determination processing that places emphasis on the performance of the drive 115. FIG. 11B is the flow chart for illustrating the encryption determination processing that places emphasis on the performance of the controller 111. In the microprogram 210 to be executed by the CPU 113, the operation mode of the encryption determination processing is set in advance. The microprogram 210 may have a function of displaying a GUI in order to select the operation mode and set a threshold value or other such information serving as a determination criterion for a load.

First, the encryption determination processing illustrated in FIG. 11A is described.

In a case of receiving the write request, the CPU 113 refers to the drive management information 201 to determine whether or not the target drive 115 has the encryption function (Step S1101).

Specifically, the CPU 113 determines whether or not the encryption function 306 in the record corresponding to the target drive 115 is "1". In a case where the encryption function 306 is "1", the CPU 113 determines that the target drive 115 has the encryption function.

In a case of determining that the target drive 115 does not have the encryption function, the CPU 113 transmits the I/O issuance instruction including the first determination information to the controller 111 coupled to the target drive 115 (Step S1103). After that, the CPU 113 brings the encryption determination processing to an end.

In a case of determining that the target drive 115 has the encryption function, the CPU 113 refers to the I/O management information 203 (controller I/O information 500) to determine whether or not the controller 111 having a low load is present (Step S1102).

For example, the CPU 113 determines whether or not the record in which the value of the I/O count 502 is smaller than a threshold value is present. In a case where the record in which the value of the I/O count 502 is smaller than the threshold value is present, the CPU 113 determines that the controller 111 having a low load is present. This determination method is merely an example, and this invention is not limited thereto. A determination method using the values of the average response time 503 and the total data transfer length 504 as indices may be employed, or a determination method using a combination of the values of a plurality of fields may be employed. The determination may be performed based on an evaluation value calculated through use of the value of at least one field.

In a case of determining that the controller 111 having a low load is present, the CPU 113 transmits the I/O issuance instruction including the first determination information to the retrieved controller 111 (Step S1103). After that, the CPU 113 brings the encryption determination processing to an end.

In a case where there are a plurality of controllers 111 having a low load, the CPU 113 selects the controller 111 having the lowest load, and transmits the I/O issuance instruction to the selected controller 111.

In a case of determining that the controller 111 having a low load is absent, the CPU 113 refers to the I/O management information 203 (drive I/O information 520) to determine whether or not the load on the target drive 115 is low (Step S1104). The same determination criterion as that of Step S1102 is employed as the determination criterion of Step S1104 in the first embodiment. The threshold value and the evaluation value to be used for the determination may differ.

In a case of determining that the load on the target drive 115 is high, the CPU 113 transmits the I/O issuance instruction including the first determination information to the controller 111 coupled to the target drive 115 (Step S1103). After that, the CPU 113 brings the encryption determination processing to an end.

The encryption determination processing illustrated in FIG. 11A places emphasis on the performance of the drive 115, and hence in a case where the load on the controller 111 and the drive 115 are both high, the controller 111 is caused to execute the encryption processing.

In a case of determining that the load on the target drive 115 is low, the CPU 113 transmits the I/O issuance instruction including the second determination information to the controller 111 coupled to the target drive 115 (Step S1105). After that, the CPU 113 brings the encryption determination processing to an end.

Next, the encryption determination processing illustrated in FIG. 11B is described.

In a case of receiving the write request, the CPU 113 refers to the drive management information 201 to determine whether or not the target drive 115 has the encryption function (Step S1151). The processing of Step S1151 is the same as the processing of Step S1101.

In a case of determining that the target drive 115 does not have the encryption function, the CPU 113 transmits the I/O issuance instruction including the first determination information to the controller 111 coupled to the target drive 115 (Step S1155). After that, the CPU 113 brings the encryption determination processing to an end.

In a case of determining that the target drive 115 has the encryption function, the CPU 113 refers to the I/O management information 203 (drive I/O information 520) to determine whether or not the load on the target drive 115 is low (Step S1152). The processing of Step S1152 is the same as the processing of Step S1104.

In a case of determining that the load on the target drive 115 is low, the CPU 113 transmits the I/O issuance instruction including the second determination information to the controller 111 coupled to the target drive 115 (Step S1153). After that, the CPU 113 brings the encryption determination processing to an end.

In a case of determining that the load on the target drive 115 is high, the CPU 113 determines whether or not the controller 111 having a low load is present (Step S1154). The processing of Step S1154 is the same as the processing of Step S1102.

In a case of determining that the controller 111 having a low load is absent, the CPU 113 transmits the I/O issuance instruction including the second determination information to the controller 111 coupled to the target drive 115 (Step S1153). After that, the CPU 113 brings the encryption determination processing to an end.

The encryption determination processing illustrated in FIG. 11B places emphasis on the performance of the controller 111, and hence in a case where the load on the controller 111 and the drive 115 are both high, the drive 115 is caused to execute the encryption processing.

In a case of determining that the controller 111 having a low load is present, the CPU 113 transmits the I/O issuance instruction including the first determination information to the retrieved controller 111 (Step S1155). After that, the CPU 113 brings the encryption determination processing to an end.

Figure 12:
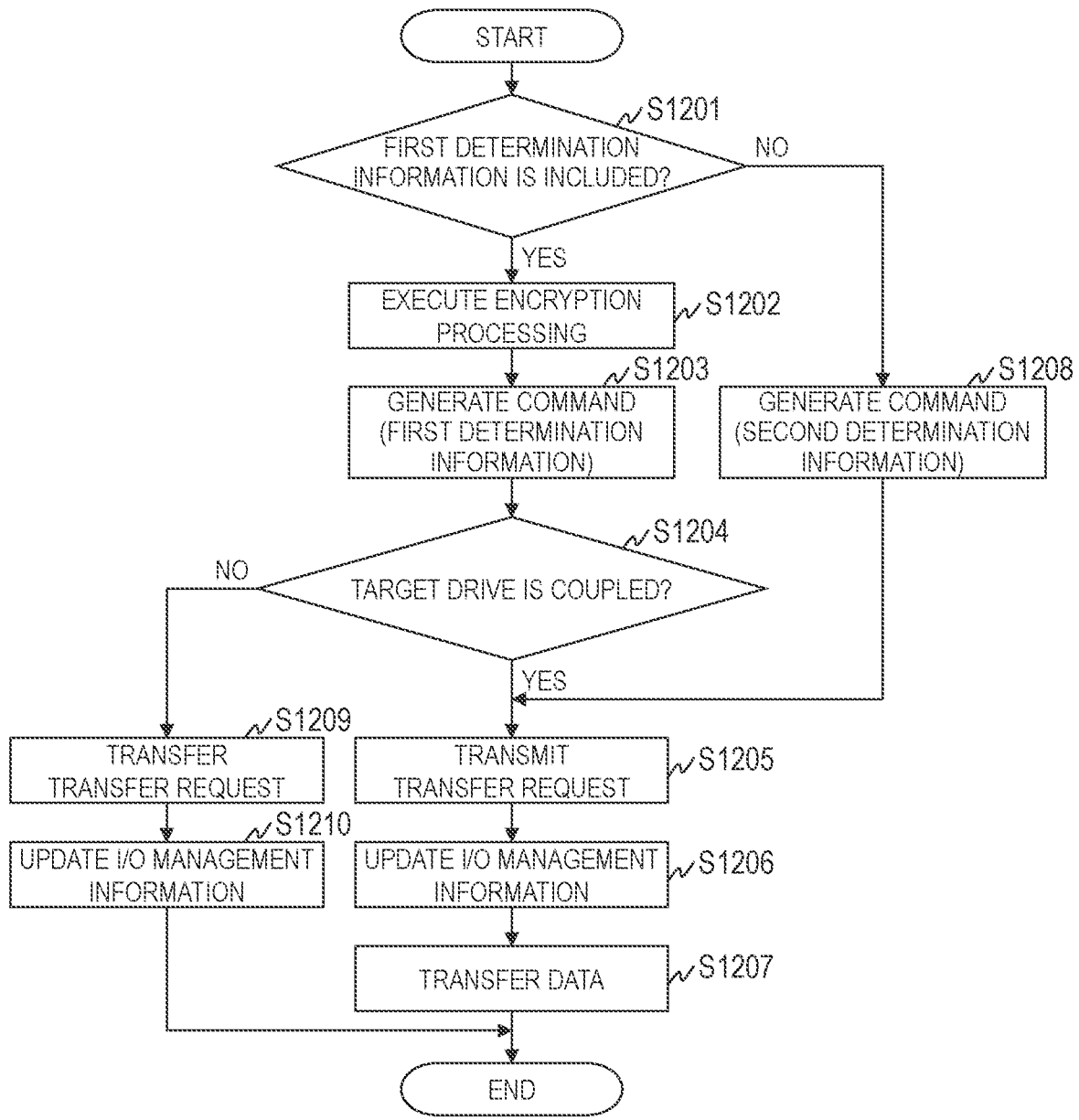
FIG. 12 is a flow chart for illustrating processing to be executed in a case where the controller in the first embodiment receives an I/O issuance instruction.

FIG. 12 is a flow chart for illustrating processing to be executed in a case where the controller 111 in the first embodiment receives the I/O issuance instruction.

The controller 111 determines whether or not the I/O issuance instruction includes the first determination information (Step S1201).

In a case of determining that the I/O issuance instruction does not include the first determination information, the controller 111 generates a command including the second determination information (Step S1208), and after that, the procedure advances to Step S1205.

In a case of determining that the I/O issuance instruction includes the first determination information, the controller 111 executes the encryption processing (Step S1202). In other words, the controller 111 encrypts the data included in the write request.

The controller 111 generates a command including the first determination information (Step S1203), and determines whether or not the target drive 115 is coupled thereto (Step S1204).

In a case of determining that the target drive 115 is coupled thereto, the controller 111 transmits the transfer request including the generated command to the target drive 115 (Step S1205).

The controller 111 updates the I/O management information 203 (Step S1206), and after receiving the transfer response, transfers the data to the target drive 115 (Step S1207). After that, the controller 111 brings the processing to an end.

For example, the controller 111 updates, for example, the I/O count 502 in its own record of the controller I/O information 500, and also adds a record corresponding to the transmission request transmitted to the issued I/O information 510. The updated information is synchronously or asynchronously reflected in the I/O management information 203 managed by another controller 111.

In a case of determining that the target drive 115 is not coupled thereto in Step S1204, the controller 111 transfers the transfer request including the generated command to the controller 111 coupled to the target drive 115 (Step S1209). The controller 111 also updates the I/O management information 203 (Step S1210). After that, the controller 111 brings the processing to an end. The controller 111 to which the transfer request is transferred transmits the transfer request to the target drive 115.

For example, the controller 111 updates, for example, the I/O count 502 in its own record of the controller I/O information 500. The updated information is synchronously or asynchronously reflected in the I/O management information 203 managed by another controller 111.

Figure 13:
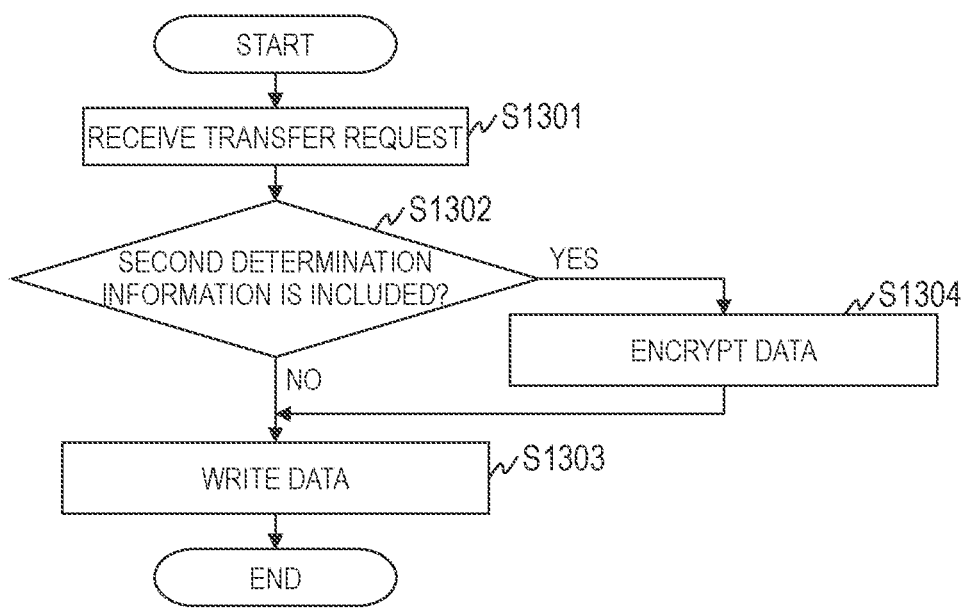
FIG. 13 is a flow chart for illustrating processing to be executed in a case where the drive in the first embodiment receives a transfer request from the controller.

FIG. 13 is a flow chart for illustrating processing to be executed in a case where the drive 115 in the first embodiment receives the transfer request from the controller 111.

In a case of receiving the transfer request (Step S1301), the drive 115 determines whether or not the command included in the transfer request includes the second determination information (Step S1302).

In a case of determining that the command does not include the second determination information, the drive 115 causes the controller 111 to write the encrypted data to the storage area (Step S1303).

In a case of determining that the command includes the second determination information, the drive 115 obtains the encryption key from the memory 116 to encrypt the data transmitted from the controller 111 (Step S1304). After that, the drive 115 writes the encrypted data to the storage area (Step S1303).

Figure 14A:
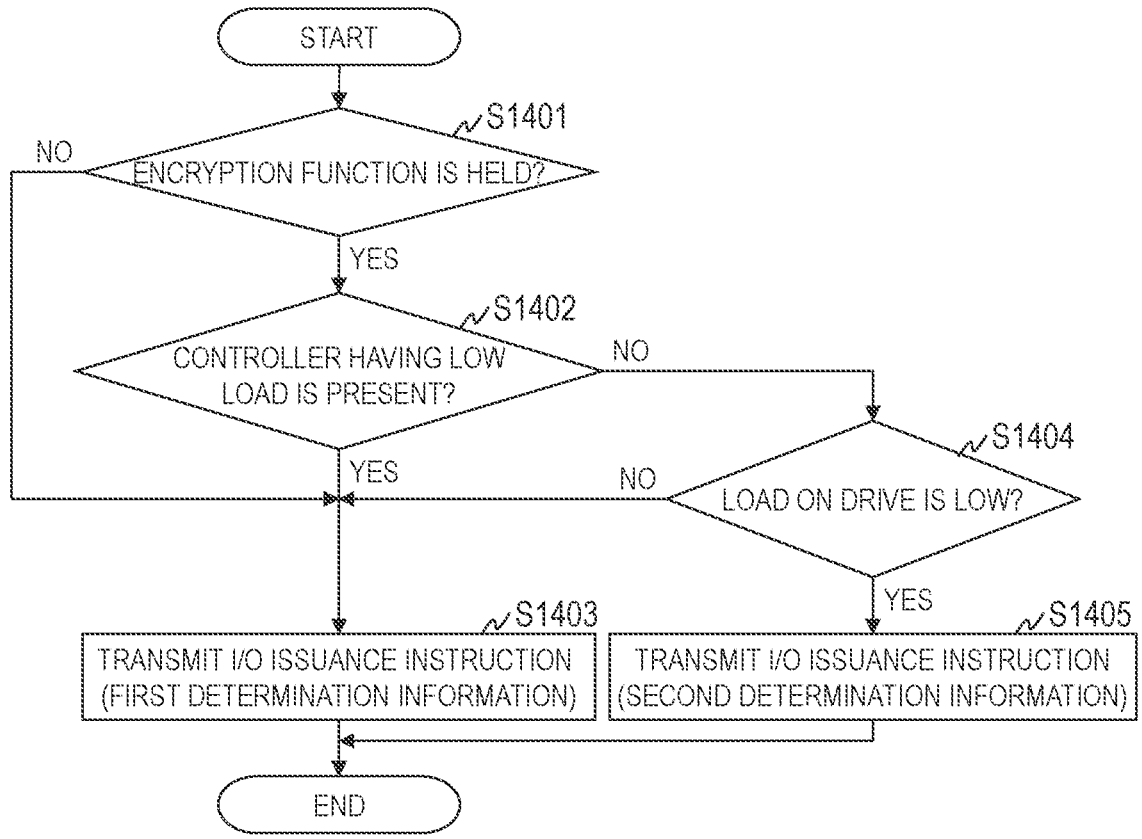
FIG. 14A and FIG. 14B are flow charts for illustrating decryption determination processing to be executed by the CPU in the first embodiment.
Figure 14B:
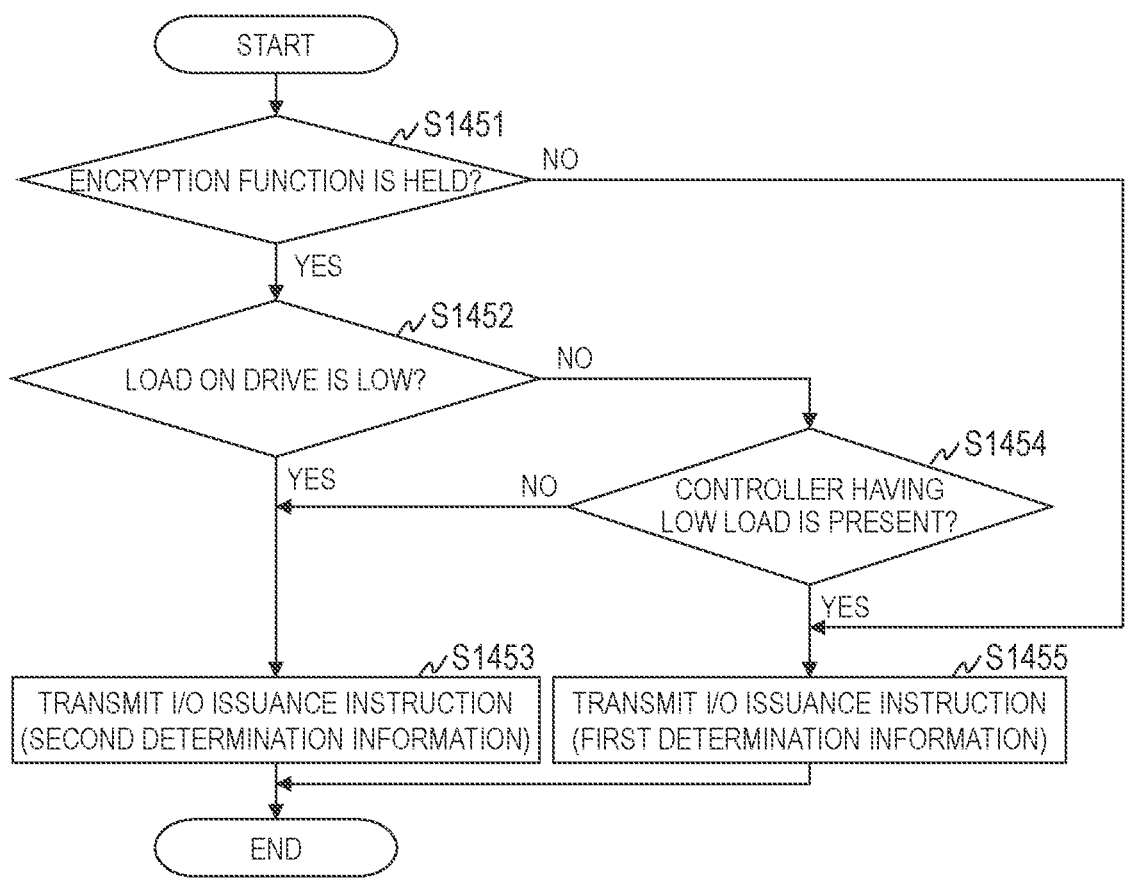

FIG. 14A and FIG. 14B are flow charts for illustrating the decryption determination processing to be executed by the CPU 113 in the first embodiment.

FIG. 14A is the flow chart for illustrating the decryption determination processing that places emphasis on the performance of the drive 115. FIG. 14B is the flow chart for illustrating the decryption determination processing that places emphasis on the performance of the controller 111. In the microprogram 210 to be executed by the CPU 113, the operation mode of the decryption determination processing is set in advance. The microprogram 210 may have a function of displaying a GUI in order to select the operation mode and set a threshold value or other such information serving as a determination criterion for a load.

First, the decryption determination processing illustrated in FIG. 14A is described.

In a case of receiving the read request, the CPU 113 refers to the drive management information 201 to determine whether or not the target drive 115 has the encryption function (Step S1401). The processing of Step S1401 is the same as the processing of Step S1101.

In a case of determining that the target drive 115 does not have the encryption function, the CPU 113 transmits the I/O issuance instruction including the first determination information to the controller 111 coupled to the target drive 115 (Step S1403). After that, the CPU 113 brings the decryption determination processing to an end.

In a case of determining that the target drive 115 has the encryption function, the CPU 113 refers to the I/O management information 203 (controller I/O information 500) to determine whether or not the controller 111 having a low load is present (Step S1402). The processing of Step S1402 is the same as the processing of Step S1102.

In a case of determining that the controller 111 having a low load is present, the CPU 113 transmits the I/O issuance instruction including the first determination information to the retrieved controller 111 (Step S1403). After that, the CPU 113 brings the decryption determination processing to an end.

In a case where there are a plurality of controllers 111 having a low load, the CPU 113 selects the controller 111 having the lowest load, and transmits the I/O issuance instruction to the selected controller 111.

In a case of determining that the controller 111 having a low load is absent, the CPU 113 refers to the I/O management information 203 (drive I/O information 520) to determine whether or not the load on the target drive 115 is low (Step S1404). The same determination criterion as that of Step S1402 is employed as the determination criterion of Step S1404 in the first embodiment. The threshold value and the evaluation value to be used for the determination may differ.

In a case of determining that the load on the target drive 115 is high, the CPU 113 transmits the I/O issuance instruction including the first determination information to the controller 111 coupled to the target drive 115 (Step S1403). After that, the CPU 113 brings the decryption determination processing to an end.

The decryption determination processing illustrated in FIG. 14A places emphasis on the performance of the drive 115, and hence in a case where the load on the controller 111 and the drive 115 are both high, the controller 111 is caused to execute the decryption processing.

In a case of determining that the load on the target drive 115 is low, the CPU 113 transmits the I/O issuance instruction including the second determination information to the controller 111 coupled to the target drive 115 (Step S1405). After that, the CPU 113 brings the decryption determination processing to an end.

Next, the decryption determination processing illustrated in FIG. 14B is described.

In a case of receiving the read request, the CPU 113 refers to the drive management information 201 to determine whether or not the target drive 115 has the encryption function (Step S1451). The processing of Step S1451 is the same as the processing of Step S1101.

In a case of determining that the target drive 115 does not have the encryption function, the CPU 113 transmits the I/O issuance instruction including the first determination information to the controller 111 coupled to the target drive 115 (Step S1455). After that, the CPU 113 brings the decryption determination processing to an end.

In a case of determining that the target drive 115 has the encryption function, the CPU 113 refers to the I/O management information 203 (drive I/O information 520) to determine whether or not the load on the target drive 115 is low (Step S1452). The processing of Step S1452 is the same as the processing of Step S1104.

In a case of determining that the load on the target drive 115 is low, the CPU 113 transmits the I/O issuance instruction including the second determination information to the controller 111 coupled to the target drive 115 (Step S1453). After that, the CPU 113 brings the decryption determination processing to an end.

In a case of determining that the load on the target drive 115 is high, the CPU 113 determines whether or not the controller 111 having a low load is present (Step S1454). The processing of Step S1454 is the same as the processing of Step S1102.

In a case of determining that the controller 111 having a low load is absent, the CPU 113 transmits the I/O issuance instruction including the second determination information to the controller 111 coupled to the target drive 115 (Step S1453). After that, the CPU 113 brings the decryption determination processing to an end.

The decryption determination processing illustrated in FIG. 14B places emphasis on the performance of the controller 111, and hence in a case where the load on the controller 111 and the drive 115 are both high, the drive 115 is caused to execute the decryption processing.

In a case of determining that the controller 111 having a low load is present, the CPU 113 transmits the I/O issuance instruction including the first determination information to the retrieved controller 111 (Step S1455). After that, the CPU 113 brings the decryption determination processing to an end.

Figure 15:
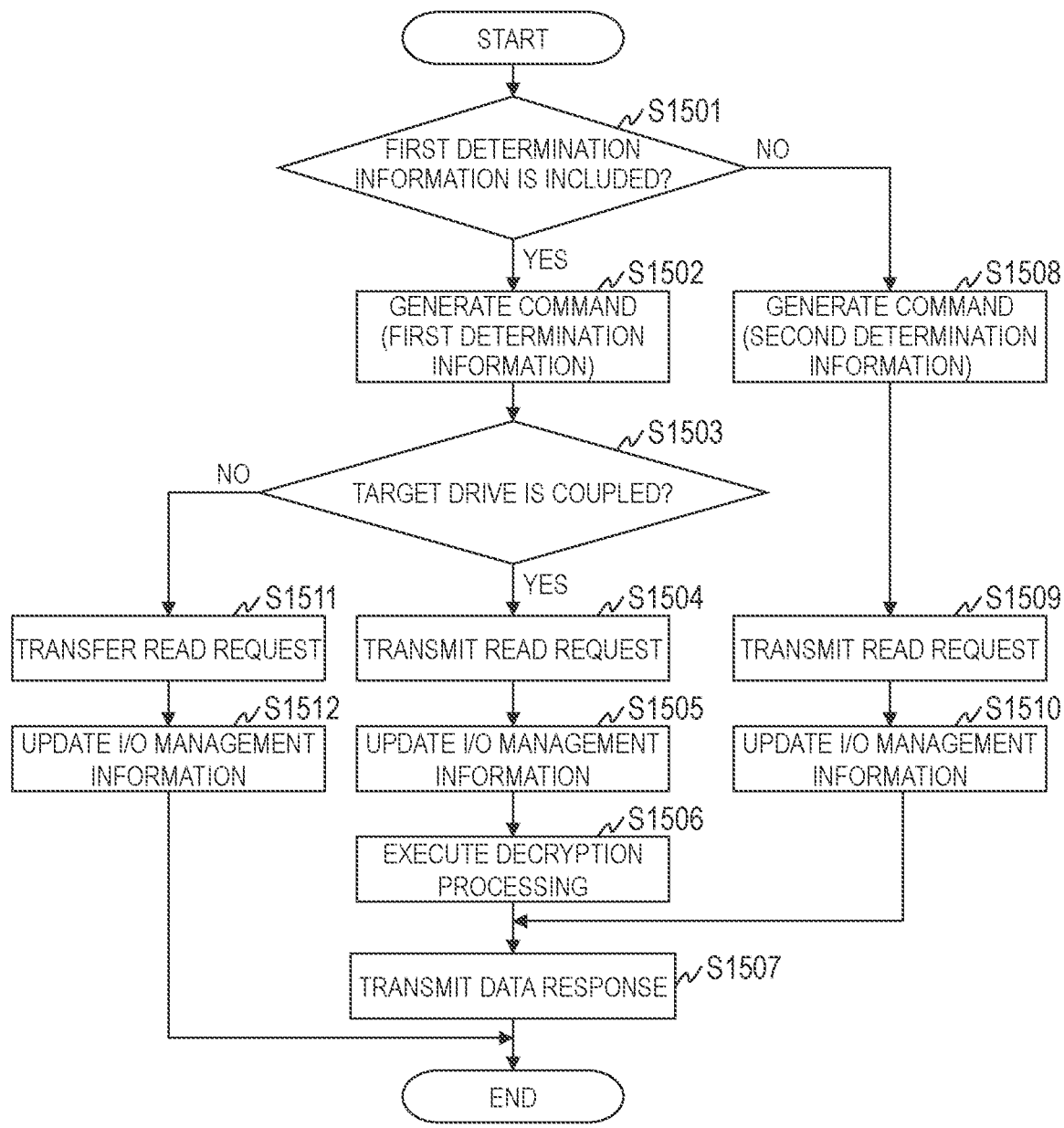
FIG. 15 is a flow chart for illustrating processing to be executed in a case where the controller in the first embodiment receives the I/O issuance instruction.

FIG. 15 is a flow chart for illustrating processing to be executed in a case where the controller 111 in the first embodiment receives the I/O issuance instruction.

The controller 111 determines whether or not the I/O issuance instruction includes the first determination information (Step S1501).

In a case of determining that the I/O issuance instruction does not include the first determination information, the controller 111 generates a command including the second determination information (Step S1508), and transmits the read request including the command to the target drive 115 (Step S1509). The controller 111 also updates the I/O management information 203 (Step S1510). After that, the controller 111 transmits the data response including the data decrypted by the target drive 115 to the host computer 101 (Step S1507). After that, the controller 111 brings the processing to an end.

In a case of determining that the I/O issuance instruction includes the first determination information, the controller 111 generates a command including the first determination information (Step S1502), and determines whether or not the target drive 115 is coupled thereto (Step S1503).

In a case of determining that the target drive 115 is coupled thereto, the controller 111 transmits the transfer request including the generated command to the target drive 115 (Step S1504). Further, the controller 111 updates the I/O management information 203 (Step S1505).

For example, the controller 111 updates, for example, the I/O count 502 in its own record of the controller I/O information 500, and also adds a record corresponding to the transmission request transmitted to the issued I/O information 510. The updated information is synchronously or asynchronously reflected in the I/O management information 203 managed by another controller 111.

In a case of receiving the encrypted data as a response to the transfer request, the controller 111 executes the decryption processing (Step S1506). Further, the controller 111 transmits the data response including the decrypted data to the host computer 101 (Step S1507). After that, the controller 111 brings the processing to an end.

In a case of determining that the target drive 115 is not coupled thereto in Step S1503, the controller 111 transfers the read request including the generated command to the controller 111 coupled to the target drive 115 (Step S1511). The controller 111 also updates the I/O management information 203 (Step S1512). After that, the controller 111 brings the processing to an end. The controller 111 to which the read request is transferred transmits the read request to the target drive 115.

For example, the controller 111 updates, for example, the I/O count 502 in its own record of the controller I/O information 500. The updated information is synchronously or asynchronously reflected in the I/O management information 203 managed by another controller 111.

Figure 16:
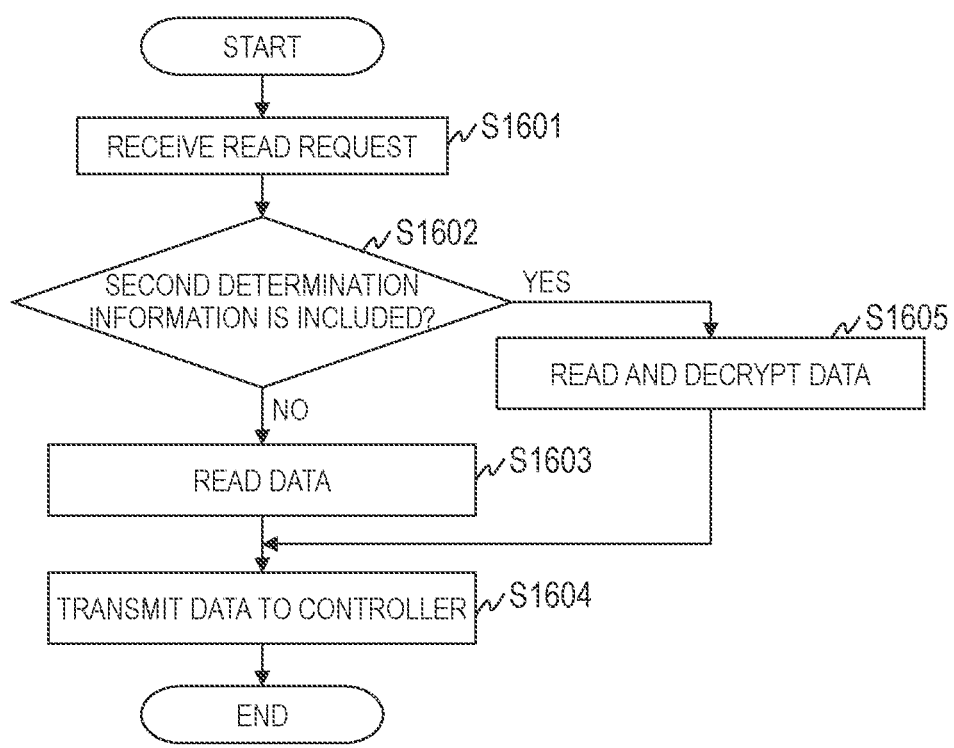
FIG. 16 is a flow chart for illustrating processing to be executed in a case where the drive in the first embodiment receives the read request from the controller.

FIG. 16 is a flow chart for illustrating processing to be executed in a case where the drive 115 in the first embodiment receives the read request from the controller 111.

In a case of receiving the read request (Step S1601), the drive 115 determines whether or not the command included in the read request includes the second determination information (Step S1602).

In a case of determining that the command does not include the second determination information, the drive 115 reads the encrypted data from the storage area (Step S1603), and transmits the read data to the controller 111 (Step S1604).

In a case of determining that the command includes the second determination information, the drive 115 obtains the encryption key from the memory 116 to decrypt the data read from the storage area (Step S1605). After that, the drive 115 transmits the decrypted data to the controller 111 (Step S1604).

In the first embodiment, each of the controllers 111 includes the memory 112, but this invention is not limited thereto. For example, the storage system 100 may include a memory shared for use by the respective controllers 111.

In the first embodiment, the CPU 113 configured to execute the microprogram 210 executes the encryption determination processing and the decryption determination processing, but the encryption determination processing and the decryption determination processing may be executed by the controller 111 instead. For example, a built-in arithmetic unit of the controller 111 executes the encryption determination processing and the decryption determination processing.

In the first embodiment, the storage system 100 is used as the target, but this invention is not limited thereto. For example, this invention can also be applied to a file server or other such server having a general hardware configuration.

According to at least one embodiment of this invention, the controller 111 can dynamically change the device whose encryption function is to be enabled depending on the load state by managing the encryption key held by each of the drives 115. This can improve security without degrading access performance.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer, comprising:
   at least one arithmetic unit;
   a first memory coupled to the at least one arithmetic unit;
   at least one controller;
   at least one second memory coupled to the at least one controller; and
   at least one storage apparatus, which is coupled to the at least one controller, and is configured to provide a storage area for storing data,
   the at least one controller and the at least one storage apparatus having a function of achieving encryption and decryption of data through use of an encryption key,
   the computer being configured to:
   execute encryption key setting processing for setting the encryption key in the at least one controller and the at least one storage apparatus so that the at least one controller holds the same encryption key as the encryption key of the at least one storage apparatus; and
   determine whether to enable the function of any one of the at least one controller and the at least one storage apparatus, based on load states of the at least one controller and the at least one storage apparatus in a case where an I/O request with respect to the at least one storage apparatus is received.

2. The computer according to claim 1,
   wherein the at least one arithmetic unit is configured to:
   determine whether to enable the function of the at least one storage apparatus based on the load states of the at least one controller and the at least one storage apparatus in a case where a write request is received;
   transmit an I/O issuance instruction including first determination information for instructing to disable the function of the at least one storage apparatus, to the at least one controller in a case of determining that the function of the at least one storage apparatus is to be disabled; and
   transmit an I/O issuance instruction including second determination information for instructing to enable the function of the at least one storage apparatus, to the at least one controller in a case of determining that the function of the at least one storage apparatus is to be enabled,
   wherein the at least one controller is configured to:
   encrypt data to be written based on the function in a case of receiving the I/O issuance instruction including the first determination information, and transmit the write request including the first determination information to the at least one storage apparatus; and
   transmit the write request including the second determination information to the at least one storage apparatus in a case of receiving the I/O issuance instruction including the second determination information, and
   wherein the at least one storage apparatus is configured to:
   write the data encrypted by the at least one controller to the storage area in a case of receiving the I/O request including the first determination information; and
   encrypt data received from the at least one controller in a case of receiving the I/O request including the second determination information, and write the encrypted data to the storage area.

3. The computer according to claim 2,
   wherein the at least one arithmetic unit is configured to:
   determine whether to enable the function of the at least one storage apparatus based on the load states of the at least one controller and the at least one storage apparatus in a case of receiving a read request;
   transmit an I/O issuance instruction including the first determination information to the at least one controller in a case of determining that the function of the at least one storage apparatus is to be disabled; and
   transmit an I/O issuance instruction including the second determination information to the at least one controller in a case of determining that the function of the at least one storage apparatus is to be enabled,
   wherein the at least one controller is configured to:
   transmit a read request including the first determination information to the at least one storage apparatus in a case of receiving the I/O issuance instruction including the first determination information, decrypt data read from the at least one storage apparatus based on the function, and output the decrypted data; and
   transmit a read request including the second determination information to the at least one storage apparatus in a case of receiving the I/O issuance instruction including the second determination information, and output the data read from the at least one storage apparatus, and wherein the at least one storage apparatus is configured to:
read the encrypted data from the storage area in a case of receiving the I/O request including the first determination information, and transmit the encrypted data to the at least one controller; and
read the encrypted data from the storage area in a case of receiving the I/O request including the second determination information, decrypt the encrypted data based on the function, and transmit the decrypted data to the at least one controller.

4. The computer according to claim 3, wherein the at least one arithmetic unit is configured to determine the load states of the at least one controller and the at least one storage apparatus based on an index relating to I/O requests being processed by the at least one controller and the at least one storage apparatus.

5. The computer according to claim 1,
wherein, in the encryption key setting processing, the at least one arithmetic unit is configured to transmit a seed to the at least one controller,
wherein the at least one controller is configured to:
generate the encryption key based on the seed in a case of receiving the seed from the at least one arithmetic unit, and store the encryption key in the at least one second memory; and
transmit the seed to the at least one storage apparatus, and
wherein the at least one storage apparatus is configured to generate, the encryption key based on the seed in a case of receiving the seed from the at least one controller, and hold the encryption key.

6. The computer according to claim 1,
wherein, in the encryption key setting processing, the at least one arithmetic unit is configured to:
generate the encryption key to be set in the at least one storage apparatus; and
transmit the encryption key to the at least one controller,
wherein the at least one controller is configured to:
store the encryption key in the at least one second memory in a case of receiving the encryption key from the at least one arithmetic unit; and
transmit the encryption key to the at least one storage apparatus, and
wherein the at least one storage apparatus is configured to hold the encryption key in a case of receiving the encryption key from the at least one controller.

7. A control method for a computer,
the computer including:
at least one arithmetic unit;
a first memory coupled to the at least one arithmetic unit;
at least one controller;
at least one second memory coupled to the at least one controller; and
at least one storage apparatus, which is coupled to the at least one controller, and is configured to provide a storage area for storing data,
the at least one controller and the at least one storage apparatus having a function of achieving encryption and decryption of data through use of an encryption key,
the control method including:
a first step of executing, by the computer, encryption key setting processing for setting the encryption key in the at least one controller and the at least one storage apparatus so that the at least one controller holds the same encryption key as the encryption key of the at least one storage apparatus; and a second step of determining, by the computer, whether to enable the function of any one of the at least one controller and the at least one storage apparatus, based on load states of the at least one controller and the at least one storage apparatus in a case where an I/O request with respect to the at least one storage apparatus is received.

8. The control method according to claim 7, wherein the second step includes:
a step of determining, by the at least one arithmetic unit, whether to enable the function of the at least one storage apparatus based on the load states of the at least one controller and the at least one storage apparatus in a case where a write request is received;
a step of transmitting, by the at least one arithmetic unit, an I/O issuance instruction including first determination information for instructing to disable the function of the at least one storage apparatus, to the at least one controller in a case of determining that the function of the at least one storage apparatus is to be disabled;
a step of transmitting, by the at least one arithmetic unit, an I/O issuance instruction including second determination information for instructing to enable the function of the at least one storage apparatus, to the at least one controller in a case of determining that the function of the at least one storage apparatus is to be enabled;
a step of encrypting, by the at least one controller, data to be written based on the function in a case of receiving the I/O issuance instruction including the first determination information, and transmitting the write request including the first determination information to the at least one storage apparatus;
a step of transmitting, by the at least one controller, the write request including the second determination information to the at least one storage apparatus in a case of receiving the I/O issuance instruction including the second determination information;
a step of writing, by the at least one storage apparatus, the data encrypted by the at least one controller to the storage area in a case of receiving the I/O request including the first determination information; and
a step of encrypting, by the at least one storage apparatus, data received from the at least one controller in a case of receiving the I/O request including the second determination information, and writing the encrypted data to the storage area.

9. The control method according to claim 8, wherein the second step includes:
a step of determining, by the at least one arithmetic unit, whether to enable the function of the at least one storage apparatus based on the load states of the at least one controller and the at least one storage apparatus in a case of receiving a read request;
a step of transmitting, by the at least one arithmetic unit, an I/O issuance instruction including the first determination information to the at least one controller in a case of determining that the function of the at least one storage apparatus is to be disabled;
a step of transmitting, by the at least one arithmetic unit, an I/O issuance instruction including the second determination information to the at least one controller in a case of determining that the function of the at least one storage apparatus is to be enabled;
a step of transmitting, by the at least one controller, a read request including the first determination information to the at least one storage apparatus in a case of receiving the I/O issuance instruction including the first determination information;

a step of transmitting, by the at least one controller, a read request including the second determination information to the at least one storage apparatus in a case of receiving the I/O issuance instruction including the second determination information;

a step of reading, by the at least one storage apparatus, the encrypted data from the storage area in a case of receiving the I/O request including the first determination information, and transmitting the encrypted data to the at least one controller;

a step of reading, by the at least one storage apparatus, the encrypted data from the storage area in a case of receiving the I/O request including the second determination information, decrypting the encrypted data based on the function, and transmitting the decrypted data to the at least one controller;

a step of decrypting, by the at least one controller, the encrypted data based on the function in a case of receiving the encrypted data from the at least one storage apparatus as a response to the read request including the first determination information, and outputting the decrypted data; and a step of outputting, by the at least one controller, the decrypted data in a case of receiving the decrypted data from the at least one storage apparatus as a response corresponding to the read request including the second determination information.

10. The control method according to claim 9, wherein the second step includes a step of determining, by the at least one arithmetic unit, the load states of the at least one controller and the at least one storage apparatus based on an index relating to I/O requests being processed by the at least one controller and the at least one storage apparatus.

11. The control method according to claim 7, wherein the first step includes:
a step of transmitting, by the at least one arithmetic unit, a seed to the at least one controller;
a step of generating, the encryption key based on the seed in a case of receiving the seed from the at least one arithmetic unit, and storing the encryption key in the at least one second memory;
a step of transmitting, by the at least one controller, the seed to the at least one storage apparatus; and
a step of generating, by the at least one controller, by the at least one storage apparatus, the encryption key based on the seed in a case of receiving the seed from the at least one controller, and holding the encryption key.

12. The control method according to claim 7, wherein the first step includes:
a step of generating, by the at least one arithmetic unit, the encryption key to be set in the at least one storage apparatus;
a step of transmitting, by the at least one arithmetic unit, the encryption key to the at least one controller;
a step of storing, by the at least one controller, the encryption key in the at least one second memory in a case of receiving the encryption key from the at least one arithmetic unit;
a step of transmitting, by the at least one controller, the encryption key to the at least one storage apparatus; and
a step of holding, by the at least one storage apparatus, the encryption key in a case of receiving the encryption key from the at least one controller.

13. A computer, comprising:
at least one controller;
at least one memory coupled to the at least one controller; and
at least one storage apparatus, which is coupled to the at least one controller, and is configured to provide a storage area for storing data,
the at least one controller and the at least one storage apparatus having a function of achieving encryption and decryption of data through use of an encryption key,
the at least one controller being configured to:
set the encryption key in the at least one controller and the at least one storage apparatus so that the at least one controller holds the same encryption key as the encryption key of the at least one storage apparatus; and
determine whether to enable the function of any one of the at least one controller and the at least one storage apparatus, based on load states of the at least one controller and the at least one storage apparatus in a case where an I/O request with respect to the at least one storage apparatus is received.

* * * * *